June 8, 1954  F. P. STROTHER  2,680,299
APPARATUS FOR TESTING THICKNESS OF MATERIAL
Filed Feb. 28, 1951  3 Sheets-Sheet 1
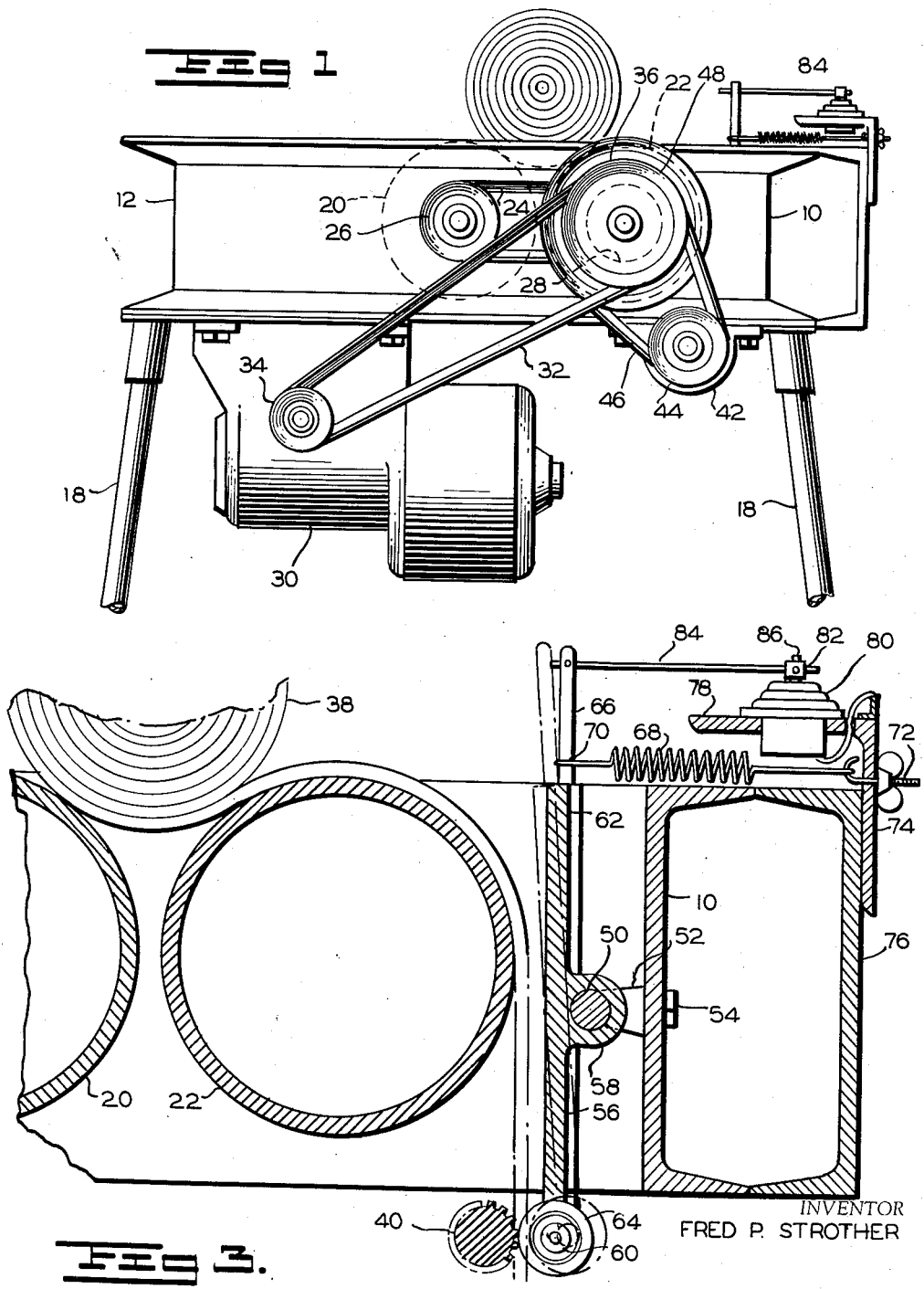
INVENTOR
FRED P. STROTHER
BY Cushman, Darby & Cushman
ATTORNEY

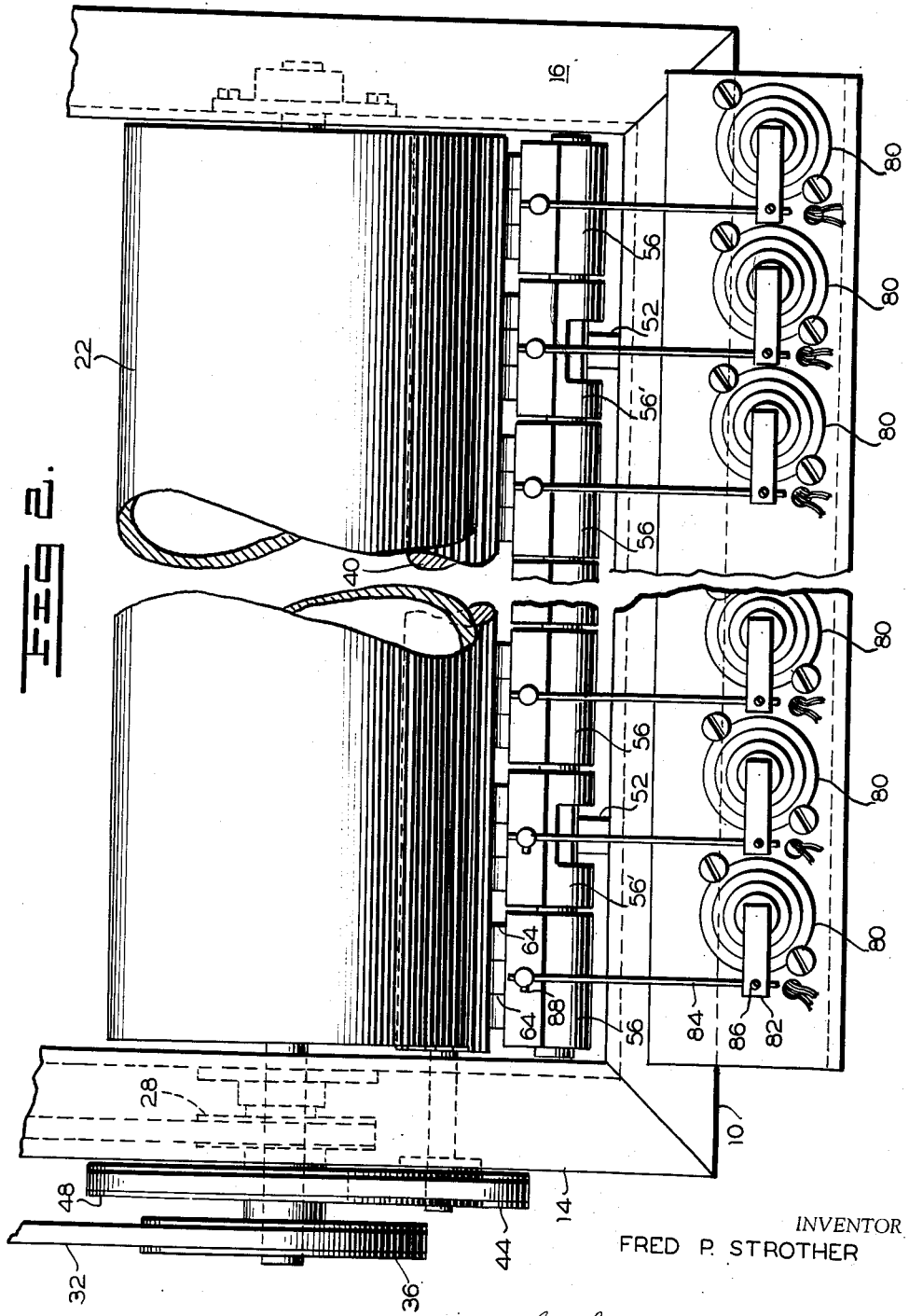

June 8, 1954 F. P. STROTHER 2,680,299
APPARATUS FOR TESTING THICKNESS OF MATERIAL
Filed Feb. 28, 1951 3 Sheets-Sheet 3
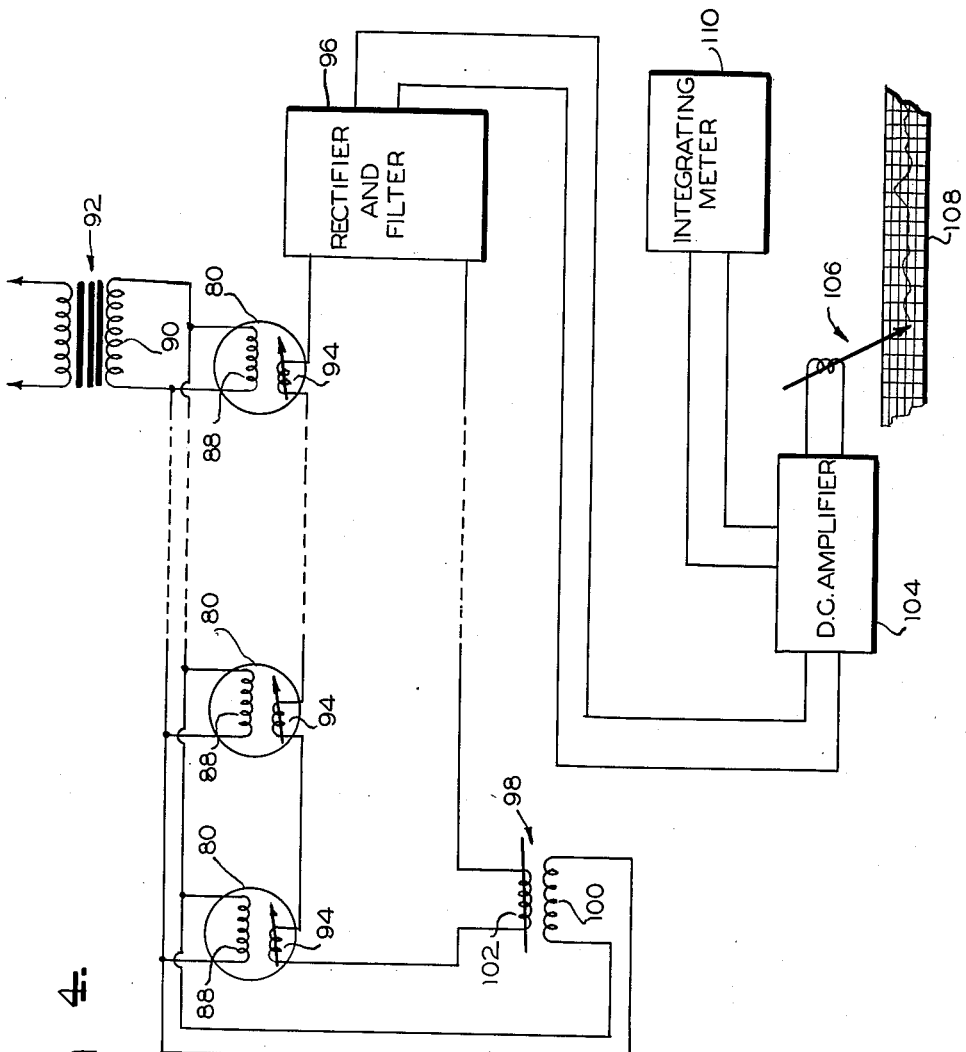
INVENTOR
FRED P. STROTHER
BY Cushman, Darby & Cushman
ATTORNEY Patented June 8, 1954

2,680,299

UNITED STATES PATENT OFFICE 2,680,299

APPARATUS FOR TESTING THICKNESS OF MATERIAL

Fred P. Strother, Shawmut, Ala., assignor to West Point Manufacturing Company, West Point, Ga., a corporation of Alabama Application February 28, 1951, Serial No. 213,111

1 Claim. (Cl. 33—148)

This invention relates to measuring the thickness of textile lap and the like.

Briefly, this invention comprises electrical apparatus for providing an indication and record of the average thickness of successive widths of textile lap or the like. According to the invention, individual voltages indicating thicknesses of fractional parts of the width of a length of lap are electrically added to provide an indication of the average thickness of the lap.

A primary object of the invention, therefore, is to provide electric means for determining the average thickness of material such as textile lap.

A further object of the invention is to provide apparatus comprising an electric averaging system for determining and recording the average thickness of textile lap and the like.

Further objects and the entire scope of the invention will become more fully apparent from the following detailed description and from the appended claim.

Further understanding of the invention may be had with reference to the accompanying drawings in which:

Figure 1 shows an end view of apparatus embodying the invention.

Figure 2 shows a reduced plan view of the apparatus in Figure 1.

Figure 3 shows a cross-sectional view of the apparatus of Figures 1 and 2.

Figure 4 shows a schematic electric diagram of circuits embodying the invention.

Referring now primarily to Figures 1–3, a channel member 10 provides a front frame member and channel member 12 provides a rear frame member. Joining channel members 10 and 12 are channel members 14 and 16 which form end members for the frame. The frame constituted by channel members 10, 12, 14 and 16 is supported by suitable legs 18.

Rotatable drums 20 and 22 are journalled in suitable bearings located in end channel members 14 and 16. These drums are adapted for rotary motion in unison by means of belt 24 operating on pulleys 26 and 28, respectively. A suitable speed reducion motor 30 is employed to drive the drums 20 and 22 in a clockwise direction as viewed in Figures 1 and 3, the motor 30 driving the drums by means of a belt 32 operating from pulley 34 at motor 30 and driving the shaft of drum 22 by means of pulley 36. Pulleys 26 and 28 are of equal diameter and, therefore, drums 20 and 22 will be driven at the same peripheral speed.

Drums 20 and 22 are so positioned that a roll 38 of lap or other material to be measured may be supported above and between the drums 20 and 22 and therefore if the drums are rotated the roll 38 will tend to unwind with the free end of the material trained downwardly over the side of drum 22.

Also suitably journalled for rotation on the end channel members 14 and 16 is a fluted roller 40. Roller 40 may be journalled in bearing blocks 42 attached to the lower flange of the end channel members. The shaft of roller 40 is extended beyond the channel members 14 and has keyed thereon a pulley 44 which is driven by belt 46 from a pulley 48 keyed to the shaft of drum 22. The relative dimensions of pulleys 44 and 48 are such that the peripheral speed of roller 40 is substantially equal to the peripheral speed of drums 20 and 22.

A shaft 50 with its ends terminating adjacent the inner surfaces of channel members 14 and 16 is supported from the inner surface of front channel member 10 by means of supporting posts 52. These posts may be maintained on the channel member 10 by means of bolts 54. Pivotally mounted on shaft 50 are a plurality of thickness sensing feeler members 56, these members being placed continuously along the length of shaft in side-by-side relation. At such points where a feeler member will interfere with a supporting post 52 the feeler member may be suitably bifurcated in its central position to accommodate the post 52. Such feeler members are designated 56'. Each feeler member 56 comprises a hub 58 receiving the shaft 50 and also comprises a lower end 60 and an upper end 62. At the lower end 60 are mounted two ball bearings 64 serving as rollers which may engage the material from roll 38 which is trained over the fluted roller 40. The upper end 62 of each feeler member 56 is provided with an upstanding post 66. A tension spring 68 extends from a point 70 of post 66 to an adjustable hook screw 72 mounted for longitudinal movement in a plate 74. The plate 74 is in turn suitably fastened as by welding to a channel member 76 suitably supported on previously mentioned channel member 10.

From the apparatus as thus far described it will be apparent that tension introduced by spring 68 will cause each of the feeler means 56 to tend to rotate clockwise about shaft 50 as viewed in Figure 3, to exert a predetermined pressure between the bearings 64 and the material overlying the fluted roller 40. Accordingly, when roller 40 is driven from motor 30 the material from roll 38 will be advanced between the roller 40 and the bearings 64. As the material thus advances, the post 66 will move toward and away from the supporting plate 74 according to the thickness of the material beneath the bearings 64 of a given feeler member 56.

As previously stated the primary object of the invention is to determine the average thickness of the width of material which at any given moment of time overlies the roller 40. This average thickness is determined by use of the following apparatus: The supporting plate 74 is provided with a rearwardly extending or horizontal shelf member 78 extending substantially the length of channel member 10. At spaced intervals corresponding to the spacing of feeler shoes 56 there are mounted in shelf 78 electric motor devices commonly referred to as selsyn motors. These motors are of a type which produce an electric signal indicating the rotational position of the shaft of the motor and will be well understood by those skilled in the art. Each of the selsyn motors is designated by reference character 80 and is provided with an arm 82 extending horizontally from the central shaft of the motor. Adjacent the outer end of each of the arms 82 there is provided an aperture through which a length of relatively stiff yet flexible wire 84, such as piano wire, may be passed. Wire 84 may be clamped in arm 82 by means of set screw 86. The ends of the wires 84 opposite the arms 82 are similarly clamped in apertures in the upper ends of posts 66 by means of set screws 88.

From the apparatus as thus far described it will be apparent that as the feeler members 56 pivot about shaft 50 because of changing thickness of the material under rollers 40, the armatures of selsyn motors 80 will be rotated correspondingly through the push-pull action of wires 84 on motor arms 82.

Referring now to Figure 4, the stationary windings 88 of selsyn motors 80 are connected in parallel with the secondary winding 90 of a suitable transformer 92. The movable windings 94 are then connected in series in a circuit loop feeding a rectifier and filter circuit 96. In addition to the selsyn motors 80 there is also provided an auxiliary selsyn motor or other suitable magnetic pick-up 98 which may be preset to represent the average thickness of the material being run. The stationary winding 100 of motor 98 may be connected in parallel with stationary windings 88 and the movable winding 102 is connected in series with the movable windings 94 in the series loop feeding circuit 96. From the circuit as thus described it will be clear that the selsyn motors 80 provide a voltage which is proportional to the algebraic sum of the positions of all of the feeler members 56. The voltage in winding 102 also adds algebraically to the sum of voltages at the coils 94. The voltage available at the output of circuit 96 may be then amplified at circuit 104 and applied to any conventional automatic recording device 106 to produce a continuous record 108 of the thickness of the material as the latter is advanced over the roller 40. The amplified signal of circuit 104 may also be applied to an integrating meter 110 if desired.

From the foregoing it will be apparent that by the present invention there is provided an average thickness measuring apparatus which is substantially free of frictional losses and in which the indication derived from any given feeler member is free from any error caused by its relationship to the other feeler members.

The foregoing detailed description has been given only for purposes of illustration and is not intended to limit the scope of the invention. The true scope of the invention is to be determined from the appended claim.

What is claimed is:

Means for continuously measuring the average thickness of a lap of flexible material comprising a roller adapted to move the material in a direction along the length of the material, the roller being positioned widthwise of the material, a plurality of thickness sensing feeler members positioned along the roller and adjacent the surface thereof, and movable in respect to the thickness of the material passing over the roller, a line circuit, a plurality of electrical units having fixed stator windings and movable rotor windings, said windings being inductively intercoupled, said stators being interconnected in parallel with said line circuit, said rotors being interconnected in a series circuit, each of said rotors being mechanically engaged with one of said feeler members, means for continuously inducing a selected reference voltage into said series circuit comprising a fixed winding interconnected in parallel with said line circuit, and a selectively movable winding interconnected in series with said series circuit, means for rectifying the total signal induced in said series circuit, means for amplifying said signal, and means for recording said signal.

References Cited in the file of this patent

UNITED STATES PATENTS

| Number | Name | Date |
| --- | --- | --- |
| 1,655,244 | Rowell | Jan. 3, 1928 |
| 1,858,304 | McLaughlin | May 17, 1932 |
| 1,969,536 | Winne | Aug. 7, 1934 |
| 2,056,918 | Bristol et al. | Oct. 6, 1936 |
| 2,062,110 | Swartwout | Nov. 24, 1936 |
| 2,143,233 | Wallace | Jan. 10, 1939 |
| 2,323,818 | Lessmann | July 6, 1943 |
| 2,336,994 | McKay | Dec. 14, 1943 |